United States Patent
Pertusi

[11] 3,876,232
[45] Apr. 8, 1975

[54] HINGED JOINT FOR ATTACHMENT OF IMPLEMENTS TO AGRICULTURAL TRACTORS

[75] Inventor: Pierluigi Pertusi, Borgaretto-Beinasco, Italy

[73] Assignee: FIAT Societa per Azioni, Turin, Italy

[22] Filed: Aug. 15, 1974

[21] Appl. No.: 497,793

[30] Foreign Application Priority Data
Dec. 19, 1973 Italy .................................. 70750/73

[52] U.S. Cl. ................ 280/415 A; 308/72; 403/122
[51] Int. Cl. ............................................ F16c 11/06
[58] Field of Search ...... 308/72; 280/415 A, 460 A, 280/461 A; 403/122

[56] References Cited
UNITED STATES PATENTS

| | | |
|---|---|---|
| 3,007,747 | 11/1961 | Isler ....................................... 308/72 |
| 3,151,882 | 10/1964 | Foxwell et al. ................. 280/415 A |
| 3,226,818 | 1/1966 | Abbott......................... 280/460 A X |
| 3,238,809 | 3/1966 | Beard........................... 280/460 AX |
| 3,394,948 | 7/1968 | Rugen et al..................... 280/415 A |
| 3,493,252 | 2/1970 | Watson et al....................... 403/122 |

*Primary Examiner*—Leo Friaglia
*Attorney, Agent, or Firm*—Sughrue, Rothwell, Mion, Zinn and Macpeak

[57] ABSTRACT

A hinged joint for use in a tractor three-point coupling has male and female elements with cooperating spherical surfaces. The spherical surface of the male element is interrupted by a cylindrical surface portion of diameter such that it can be inserted through the entry aperture of the female element, the male element subsequently being rotated through 90° to render it captive within the female element. A part-annular expansion spring seats in a groove in the entry aperture of the female element to prevent removal of the male element unless the spring is contracted.

10 Claims, 3 Drawing Figures

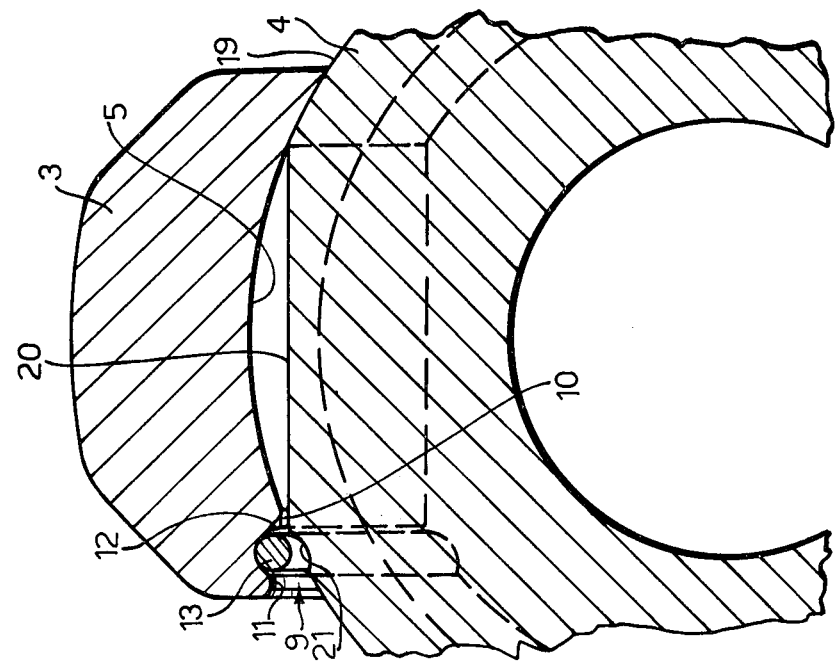
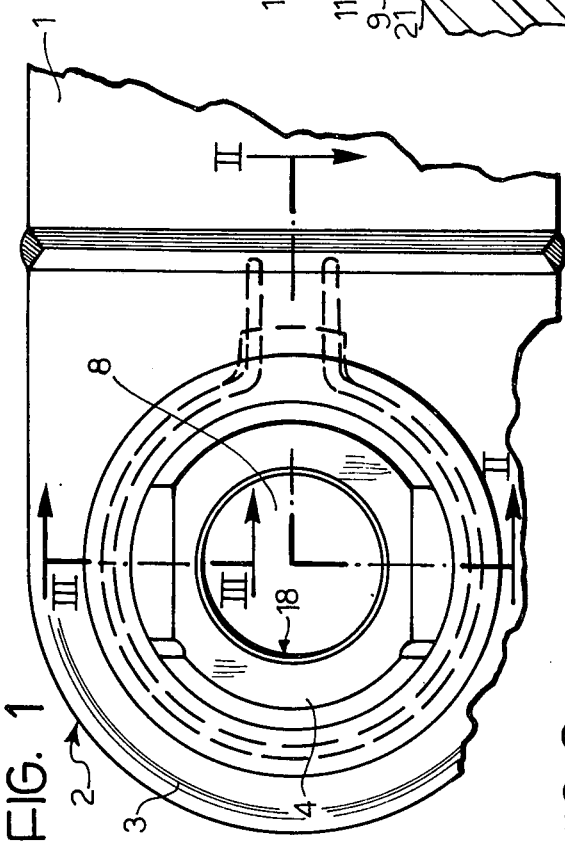
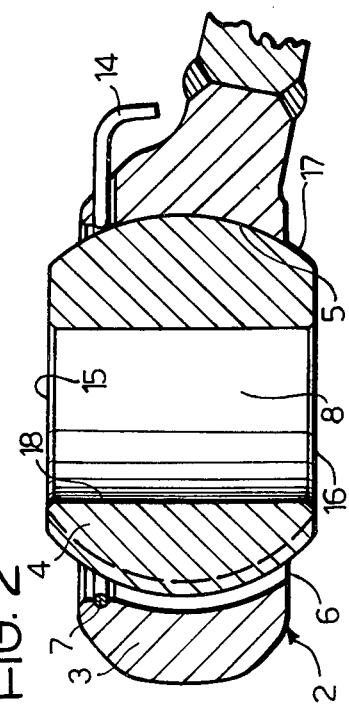

3,876,232

HINGED JOINT FOR ATTACHMENT OF IMPLEMENTS TO AGRICULTURAL TRACTORS

BACKGROUND OF THE INVENTION

This invention relates to hinged joints, and particularly to hinged joints employed to attach agricultural implements to agricultural tractors.

The joints under discussion consist of co-operating monolithic male and female elements. The female element has an internal part-spherical surface accessible through a circular entry aperture and the male element is provided with a more extensive spherical surface, which cooperates with the internal surface of the female element. The male element usually has a through bore in which a towing pin is located in use of the hinged joint, the through bore extending between opposite parallel flat faces of the male element.

To allow the male element to be inserted into the female element through the entry aperture some material must be removed from one or the other element, or from both elements.

Implements for agricultural tractors and their towing pins fall into three classes according to tractor power. The dimensions of the articulated joints under discussion have also been standardised in three classes so that the bore in the male element which accommodates the towing pin has three different diameters and two different widths as measured between the two parallel flat faces.

It is desirable at times to be able to employ an implement of a given class with a tractor of a different class and it is advantageous to be able to exchange the male elements belonging to the various classes using the same female element on the towing arm of the tractor.

Various ways are known of removing the material necessary for the assembly of the male and female elements and the present invention aims to provide a joint which is easily assembled and disassembled, particularly for the exchanging of agricultural implements of different classes on the same tractor, which offers the minimum loss of working surface between the housing and the spherical surface of the male element and which allows simple and easy machining of the male and female elements or of one of them.

SUMMARY OF THE INVENTION

According to the present invention there is provided a hinged joint particularly for a hinged coupling for attaching implements to agricultural tractors, comprising monolithic male and female elements having cooperating part-spherical surfaces, the female element having a circular entry aperture for the insertion of the male element into the female element, and the curved surface of the male element being bounded by parallel flat faces, wherein the curved surface of the male element consists essentially of a spherical surface portion and a cylindrical surface portion the axis of which is parallel to the parallel flat faces of the male element and passes through the centre of the spherical surface portion, said cylindrical surface portion having a diameter just smaller than that of the said entry aperture.

BRIEF DESCRIPTION OF THE DRAWINGS

The invention will now be described in more detail, by way of non-limiting example, with reference to the attached drawings, in which:

FIG. 1 is a plan view of one end of a three point coupling arm for attaching implements to an agricultural tractor, this end carrying a hinged joint according to one embodiment of the present invention;

FIG. 2 is a sectional view taken on line II—II of FIG. 1, and

FIG. 3 is a sectional view taken on line III—III of FIG. 1, on an enlarged scale, with the male element shown upside-down in the position of entry.

DETAILED DESCRIPTION OF THE ILLUSTRATED EMBODIMENTS

In the drawings part of an arm 1 of a three point coupling for attaching implements to agricultural tractors is shown. A hinged joint 2 according to the invention is fixed to the free end of the arm 2 and consists of a female element 3 welded to arm 1 and a male element 4 inserted into the female element. Both the elements 3, 4 are monolithic and have co-operating spherical surfaces to allow the elements to function as an articulated joint of the spherical type and with the usual freedom of movement of a joint of this type.

A spherical internal surface 5 is formed in the female element 3 and is defined between two parallel flat faces 6 and 7 of the female element. The centre 8 of curvature of the surface 5 is equidistant from the two flat faces 6 and 7. An entry aperture 9 (FIG. 3) is provided in the plane face 7 and allows the male element 4 to be passed into the female element 3. The aperture 9 is circular and is delimited by two coaxial cylindrical surfaces 10 and 11 of which the surface 10, nearer the spherical surface 5, is of smaller diameter than the other surface 11.

An annular groove 12 is provided in the female element 3 between the two cylindrical surfaces 10 and 11 and a part-annular expansion spring 13 is located in the groove 12. A part of element 3 is removed to house the ends 14 of the spring 13, these ends 14 being shaped in a suitable way so that they can be handled by an operator. The depth of groove 12 is such that when the spring 13 is positioned in it, the internal diameter of the spring 13 is smaller than the diameter of the cylindrical surface 10 of smaller diameter.

The male element 4 has a curved outer surface 17 of greater extent than the spherical surface 5 and delimited by two flat parallel faces is and 16. A through cylindrical bore 18, suitable for receiving a pivot pin of an agricultural implement, extends between the faces 15 and 16 and is perpendicular thereto.

The curved surface 17 consists essentially of a spherical surface portion 19 and a cylindrical surface portion 20. The centre of curvature of the spherical surface portion 19 is equidistant from faces 15 and 16 and coincides with centre 8 of the spherical surface 5 when the joint is assembled (FIG. 1), the diameter of the spherical surface 19 being just smaller than that of the surface 5 so that the two spherical surfaces 15 and 19 can slide one within the other in use of the joint. The axis of the cylindrical surface portion 20 passes through the centre of the spherical surface portion 19 and is parallel to the flat faces 15 and 16. The diameter of the cylindrical surface portion 20 is just smaller than that of the cylindrical surface 10 of the entry aperture 9 of the female element 3.

A circumferential groove 21 is formed in the curved surface 17 of the male element 4 and lies substantially in a plane containing one of the intersections between the spherical and cylindrical portions 19, 20. When the male element 4 is positioned as shown in FIG. 3, that is, rotated by 90° with respect to the position shown in FIGS. 1 and 2 about an axis which lies along the line III—III, the groove 21 faces the groove 12 of the female element 3 so that spring 13 can be moved from one groove to the other. The depth of the groove 21 is such that when the spring 13 is housed in it, the external diameter of the spring is smaller than the cylindrical surface 11 of the entry aperture 9 of the female element 3. It will be apparent that the smaller the diameter of cylindrical surface 11, the deeper the groove 21 will have to be to maintain the relationship mentioned above.

To fit the male element 4 into the female element 3 of the joint 2 described above, it is sufficient to align the axis of the cylindrical surface portion 20 of the male element 4 with the common axis of the cylindrical surfaces 10 and 11 of the entry aperture 9 in the female element 3 and then insert the male element 4 into the female element 3 through the entry aperture 9. When the curved surface 17 of the male element 4 comes into contact with the spherical surface 5 of the female element 3, as shown in FIG. 3, it is possible to rotate the male element 4 so as to orientate the faces 15 and 16 parallel to faces 6 and 7, with the bore 18 in position to receive a pivot pin (not shown) of an implement for connection to the arm 1 of the agricultural tractor.

To utilize the locking device constituted by the part-annular expansion spring 13, the latter is located in and pressed into the groove 21 before the male element 4 is inserted into the female element 3. When the groove 21 is facing the groove 12 of the female element 3 the spring 13 is released and expands into the groove 12, leaving the male element 4 free to rotate but at the same time preventing the male element 4 from coming out of the female element 3 until the spring 13 is pressed into the groove 21 again.

Instead of the expansion spring locking device herein described and illustrated other locking means, already known, can be used. These do not, however, afford the advantages deriving from the relative positioning of the grooves 12 and 21 and the spring 13 as previously described. For example, a safety ring may be placed in a groove formed in the entry aperture 9. In some embodiments it would be possible to omit a locking device altogether.

It is clear that the machining necessary to permit the assembly and disassembly of the two elements 3, 4 of the joint herein described will involve in general only the machining of the two cylindrical surfaces 10 and 11 and the cylindrical surface portion 20, these surfaces being formed easily and economically using a lathe. The areas of the spherical surfaces of the male and female elements available for sliding contact, that is, those areas which are not machined to form the cylindrical surfaces, depend on the diameter chosen for the entry aperture 9. The smaller this diameter the greater the loss of the area of the spherical surface 5 around the aperture due to the machining of the cylindrical surfaces and the larger will be the area of the cylindrical surface portion 20 and, therefore, the greater the non-working area of the male element 4.

It is, in fact, better to reduce to the minimum possible the area of the cylindrical surface portion 20 of the male element 4, particularly for use with agricultural tractors provided with three-point couplings for implements. In such couplings a lateral load is absorbed by one of the lower arms and it is possible therefore to provide two joints in accordance with the invention on two lower arms of the coupling so that when a lateral load is applied to the coupling it is absorbed by the joint whose entry aperture is directed towards the opposite direction to that of the load, the two entry apertures facing in opposite lateral directions.

I claim:

1. A hinged joint particularly for a hinged coupling for attaching implements to agricultural tractors, comprising monolithic male and female elements having cooperating spherical surfaces, the female element having a circular entry aperture for the insertion of the male element into the female element, and the male element having parallel flat faces bounding its curved surface wherein the improvement consists in the curved surface of the male element comprising a spherical surface portion and a cylindrical surface portion, the axis of said cylindrical portion being parallel to the flat faces of the male element and passing through the centre of the spherical surface portion, and the cylindrical surface portion having a diameter just smaller than that of the said entry aperture.

2. The hinged joint defined in claim 1, wherein the said axis of the cylindrical surface portion is equidistant from the flat faces of the male element.

3. The hinged joint defined in claim 1 wherein the male element has at least one cylindrical surface bounding the entry aperture therein.

4. The hinged joint defined in claim 3, wherein the male element has two coaxial cylindrical surfaces bounding the entry aperture and having different diameters, the cylindrical surface nearer the spherical surface of the female element having the smaller diameter.

5. The hinged joint defined in claim 1 including means for retaining the male element in the female element.

6. The hinged joint defined in claim 5, wherein said retaining means comprise means defining a first circular groove in the entry aperture of the said female element and a second groove adjacent one of the intersections of the spherical and cylindrical surface portions of the male element, whereby after a relative rotation of the two elements has taken place the two grooves are disposed in register with one another, and including a circular expansion spring housed normally in the first groove and transferable from one groove to the other, whereby when the spring is in the first groove it blocks removal of the male element from the female element while when the spring is in the second groove such removal of the male element is possible.

7. The hinged joint defined in claim 1, wherein the female element has two parallel flat faces bounding the spherical surface of the female element said flat faces being separated from each other by a shorter distance than the width of the male element between the two flat parallel faces bounding the curved surface of the latter.

8. The hinged joint defined in claim 7, wherein the distance between the two flat faces which limit the spherical surface of the female element is smaller than the width of the male element belonging to the class of similar joints of smaller size.

9. A hinged three point coupling for attaching agricultural implements to an agricultural tractor including two lower arms each having a hinged joint for attachment of an implement, the hinged joint comprising monolithic male and female elements having cooperating spherical surfaces, the female element having a circular entry aperture for the insertion of the male element into the female element, wherein the improvement consists in the curved surface of the male element comprising a spherical surface portion and a cylindrical surface portion the axis of said cylindrical portion being perpendicular to the axis of the entry aperture and passing through the centre of the spherical surface portion, and the cylindrical surface portion having a diameter just smaller than that of the said entry aperture.

10. The hinged coupling defined in claim 9, wherein the entry apertures in the two joints on the lower arms are defined by respective cylindrical surfaces and face in opposite directions.

* * * * *